(12) United States Patent
Stephenson et al.

(10) Patent No.: US 10,661,513 B2
(45) Date of Patent: May 26, 2020

(54) MULTI-PLANAR FIBER MATRIX TOOL-LESS PREFORM FOR RESIN INFUSION

(71) Applicant: THE BOEING COMPANY, Chicago, IL (US)

(72) Inventors: Benjamin J. Stephenson, Seattle, WA (US); Hugh A. Yap, Renton, WA (US); Gwen Marie Lanphere Gross, Redmond, WA (US); William S. Hollensteiner, Kent, WA (US); Scott K. Frankenbery, Tacoma, WA (US); Dennis J. Hanks, Enumclaw, WA (US)

(73) Assignee: THE BOEING COMPANY, Chicago, IL (US)

( * ) Notice: Subject to any disclaimer, the term of this patent is extended or adjusted under 35 U.S.C. 154(b) by 1019 days.

(21) Appl. No.: 14/955,902

(22) Filed: Dec. 1, 2015

(65) Prior Publication Data
US 2017/0151721 A1    Jun. 1, 2017

(51) Int. Cl.
*B29C 70/44*        (2006.01)
*B33Y 10/00*        (2015.01)
(Continued)

(52) U.S. Cl.
CPC ............ *B29C 70/44* (2013.01); *B29C 64/188* (2017.08); *B29C 70/443* (2013.01);
(Continued)

(58) Field of Classification Search
CPC .......................... B29C 70/465; B29C 70/467
See application file for complete search history.

(56) References Cited

U.S. PATENT DOCUMENTS 3,666,600 A * 5/1972 Yoshino ................ B29C 70/086
156/382
6,630,093 B1   10/2003 Jones
(Continued)

FOREIGN PATENT DOCUMENTS

AU    2016228281 A1    6/2017
CN    102223989 A      10/2011
(Continued)

OTHER PUBLICATIONS

Ivanov, Dmitry S., et al. "Stabilizing textile preforms by means of liquid resin print: a feasibility study." Advanced Manufacturing: Polymer & Composites Science 1.1 (Dec. 23, 2014): 26-35. (Year: 2014).*

(Continued)

*Primary Examiner* — Benjamin A Schiffman
(74) *Attorney, Agent, or Firm* — Patterson + Sheridan, LLP

(57) ABSTRACT

A system and method for manufacturing composite parts has been developed which offers the ability to produce composite parts in an infusion resin process without the use of expensive preforms or tools. In addition, the methods of manufacturing composite parts described herein offer the ability to produce composite parts having complex structures without the need for complex tooling. The method of manufacturing and systems described herein typically include printing a part skeleton using an additive manufacturing process followed by infusing the part skeleton with resin and curing the resin infused part skeleton to form the composite part.

13 Claims, 8 Drawing Sheets

(51) Int. Cl.
*B33Y 80/00* (2015.01)
*B29C 70/68* (2006.01)
*B29C 64/188* (2017.01)
B33Y 30/00 (2015.01)
B29K 27/18 (2006.01)
B29L 31/00 (2006.01)

(52) U.S. Cl.
CPC .......... *B29C 70/682* (2013.01); *B33Y 80/00* (2014.12); *B29C 70/688* (2013.01); *B29K 2027/18* (2013.01); *B29L 2031/00* (2013.01); *B33Y 10/00* (2014.12); *B33Y 30/00* (2014.12)

(56) References Cited

U.S. PATENT DOCUMENTS

| | | | |
|---|---|---|---|
| 6,818,159 B2 * | 11/2004 | Hinz | B29C 70/443 |
| | | | 264/102 |
| 7,334,782 B2 | 2/2008 | Woods et al. | |
| 8,066,503 B2 * | 11/2011 | Hawkins | B29C 70/342 |
| | | | 425/388 |
| 2010/0040722 A1 | 2/2010 | Glain et al. | |
| 2010/0074979 A1 | 3/2010 | Cundiff et al. | |
| 2011/0037199 A1 | 2/2011 | Young | |
| 2012/0043704 A1 | 2/2012 | Hawkins | |
| 2012/0119422 A1 | 5/2012 | Lockett et al. | |
| 2012/0231107 A1 | 9/2012 | Waldrop et al. | |
| 2012/0305169 A1 | 12/2012 | Hanks et al. | |
| 2013/0340944 A1 | 12/2013 | Modin | |
| 2014/0080376 A1 | 3/2014 | Jalowka | |
| 2014/0116616 A1 | 5/2014 | Kline et al. | |
| 2015/0090392 A1 | 4/2015 | Bertrand et al. | |
| 2017/0232641 A1 * | 8/2017 | Humfeld | B29C 64/10 |
| | | | 264/40.1 |

FOREIGN PATENT DOCUMENTS

| | | |
|---|---|---|
| CN | 102700147 A | 10/2012 |
| EP | 3196000 A1 | 7/2017 |
| WO | 2008027363 A2 | 3/2008 |

OTHER PUBLICATIONS

Canadian Office Action for Application No. 2941842 dated Sep. 12, 2019.
European Patent Office Examination Report for Application 16 188 909.2-1019 dated Jul. 23, 2019.
Chinese Office Action for Application No. 2019121201827650 dated Dec. 17, 2019.

* cited by examiner

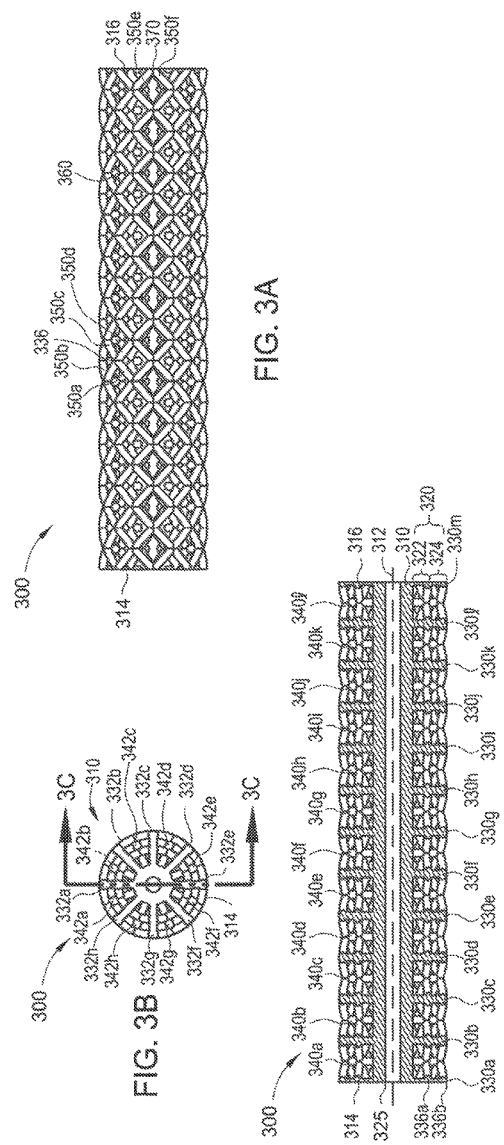

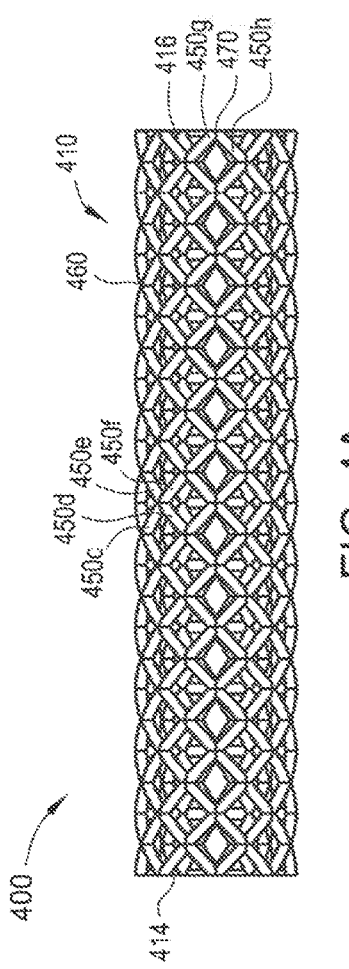
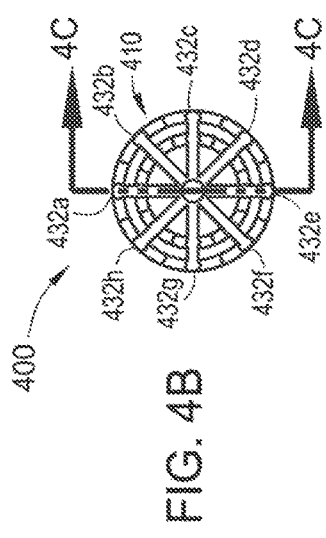
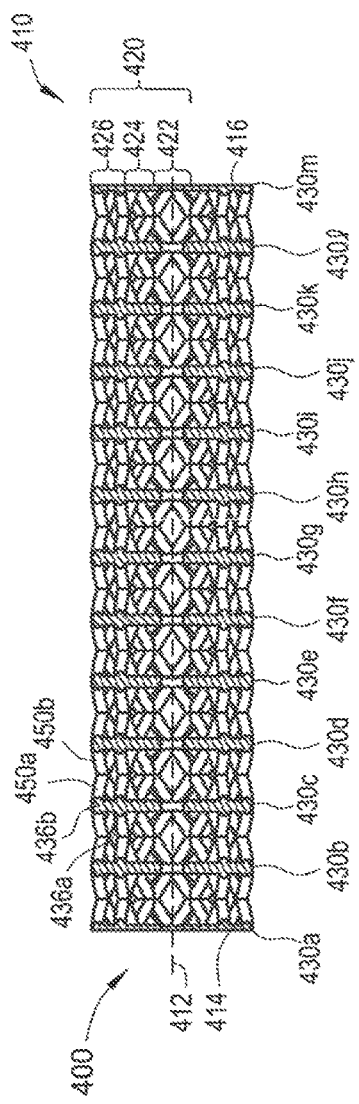
FIG. 4A
FIG. 4B
FIG. 4C

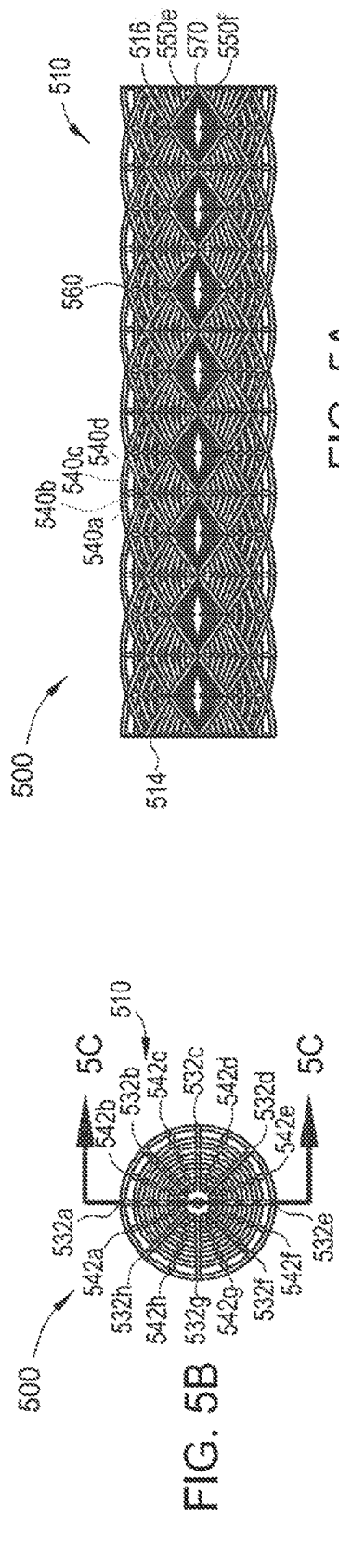
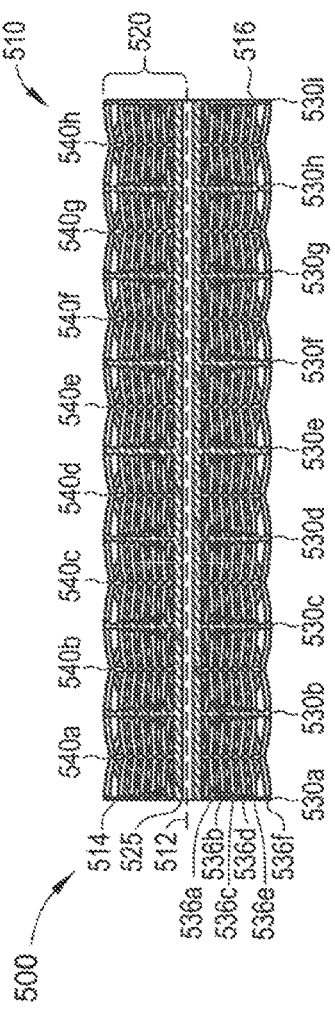
FIG. 5A
FIG. 5B
FIG. 5C

MULTI-PLANAR FIBER MATRIX TOOL-LESS PREFORM FOR RESIN INFUSION

FIELD

The implementations described herein generally relate to composite part manufacturing and, more particularly to methods and apparatus for manufacturing composite parts using resin infusion processes.

BACKGROUND

Fiber-reinforced resin materials, or "composite" materials as they are commonly known, have many applications in the aerospace, automotive, and marine fields because of their high strength-to-weight ratios, corrosion resistance, and other unique properties. Conventional composite materials typically include glass, carbon, or polyamide fibers in woven and/or non-woven configurations. The fibers can be pre-impregnated with uncured resin to form fiber plies in a raw material stage. The fiber plies can be manufactured into parts by laminating them on a mold surface. Heat and pressure can be applied to the laminated plies to cure the resin and harden the laminate in the shape of the mold. The heat and pressure can be applied with an autoclave, a heated flat or contoured forming tool, or a combination of methods including the use of a vacuum bag.

Composite parts can be formed in the above manner on both male and female tools. The tools are machined to exacting measurements and must not have their dimensions altered during the repeated laminate fabrication processes, which may include temperature and/or pressure cycling. Ideally, thermal characteristics of the tooling should be comparable to those of the composite parts being fabricated. In this way, substantially identical laminates are formed during laminate production. However, tools, especially tool surfaces can be become damaged, for example, during storage or transport. When a tool is damaged, it must be repaired or replaced. Due to the significant expense required to fabricate precision metallic tooling for laminate production, it is often impractical to maintain duplicate metal tools. As a result, such repair or replacement often adversely affects, and otherwise interrupts or delays, laminate production.

Further, as the structure of composite parts becomes more complex, it becomes more difficult to fabricate precision tools capable of achieving desired tolerances of the composite parts, for example, composite parts with compound contours and undercuts.

Accordingly, there remains a need in the art for composite parts and methods and apparatus for manufacturing these composite parts using resin infusion processes without expensive hard tooling.

SUMMARY

The implementations described herein generally relate to composite part manufacturing and, more particularly to methods and apparatus for manufacturing composite parts using resin infusion processes. According to one implementation, a method of manufacturing a composite part is provided. The method comprises printing a part skeleton, covering the part skeleton with a permeable release film, and infusing the covered part skeleton with resin.

In another implementation, a tool-less resin infusion system for forming a composite part is provided. The system comprises a supply of resin sufficient to infuse a printed part skeleton and a resin infusion device. The resin infusion device comprises a mandrel and a bagging film. The mandrel comprises a part-receiving zone for receiving a printed part skeleton and a resin-receiving zone for receiving a supply of resin. The resin-receiving zone is positioned adjacent to the part-receiving zone. The bagging film generates an envelope for surrounding the part-receiving zone and the resin-receiving zone.

In yet another implementation, a method of manufacturing is provided. The method comprises infusing a printed part skeleton with resin to form a composite part, wherein the printed part skeleton is positioned in a tool-less resin infusion device.

BRIEF DESCRIPTION OF ILLUSTRATIONS

So that the manner in which the above-recited features of the present disclosure can be understood in detail, a more particular description of the disclosure briefly summarized above may be had by reference to implementations, some of which are illustrated in the appended drawings. It is to be noted, however, that the appended drawings illustrate only typical implementations of this disclosure and are therefore not to be considered limiting of its scope, for the disclosure may admit to other equally effective implementations.

FIG. 3A is a perspective view of one example of a tubular part skeleton formed according to implementations described herein;

FIG. 3B is a front view of the tubular part skeleton formed according to implementations described herein;

FIG. 3C is a cross-sectional view of the tubular part skeleton taken along line 3C-3C of FIG. 3B according to implementations described herein;

FIG. 4A is a perspective view of another example of a tubular part skeleton formed according to implementations described herein;

FIG. 4B is a front view of the tubular part skeleton formed according to implementations described herein;

FIG. 4C is a cross-sectional view of the tubular part skeleton taken along line 4C-4C of FIG. 4B according to implementations described herein;

FIG. 5A is a perspective view of another example of a tubular part skeleton formed according to implementations described herein;

FIG. 5B is a front view of the tubular part skeleton formed according to implementations described herein;

FIG. 5C is a cross-sectional view of the tubular part skeleton taken along line 5C-5C of FIG. 5B according to implementations described herein;

To facilitate understanding, identical reference numerals have been used, wherever possible, to designate identical elements that are common to the Figures. Additionally, elements of one implementation may be advantageously adapted for utilization in other implementations described herein.

DETAILED DESCRIPTION

The following disclosure describes composite parts and more particularly methods for manufacturing composite parts using resin infusion processes without the use of a preform or tool. Certain details are set forth in the following description and in FIGS. 1-8 to provide a thorough understanding of various implementations of the disclosure. Other details describing well-known structures and systems often associated with resin infusion processes, additive manufacturing processes and the manufacturing of composite parts are not set forth in the following disclosure to avoid unnecessarily obscuring the description of the various implementations.

Many of the details, dimensions, angles and other features shown in the Figures are merely illustrative of particular implementations. Accordingly, other implementations can have other details, components, dimensions, angles and features without departing from the spirit or scope of the present disclosure. In addition, further implementations of the disclosure can be practiced without several of the details described below.

A system and method for manufacturing composite parts has been developed which offers the ability to produce composite parts in an infusion resin process without the use of expensive preforms or tools. In addition, the methods of manufacturing composite parts described herein offer the ability to produce composite parts having complex structures without the need for complex tooling. The method of manufacturing and systems described herein typically include printing a part skeleton using an additive manufacturing process followed by infusing the part skeleton with resin and curing the resin infused part skeleton to form the composite part.

Although the implementations described herein may be used to form any type of composite part, the implementations described herein are particularly beneficial for forming complex composite parts. Examples of complex composite parts include parts having at least feature selected from: compound contours, multiple recesses, undercuts, projections, and truss structures (e.g., straight trusses, arched trusses, planar trusses and space trusses). Planar trusses include structures having one or more elongate struts connected at joints referred to as nodes. A planar truss, for example, may include one or more truss units where each of the struts is a substantially straight member such that the entirety of the struts and the nodes of the one or more truss units lie in substantially the same plane. Space trusses include trusses having struts and nodes that are not substantially confined in a single two-dimensional plane. A space truss may include two or more planar trusses (e.g., planar truss units) wherein at least one of the two or more planar trusses lies in a plane that is not substantially parallel to a plane of at least one or more of the other two planar trusses.

Figure 1:
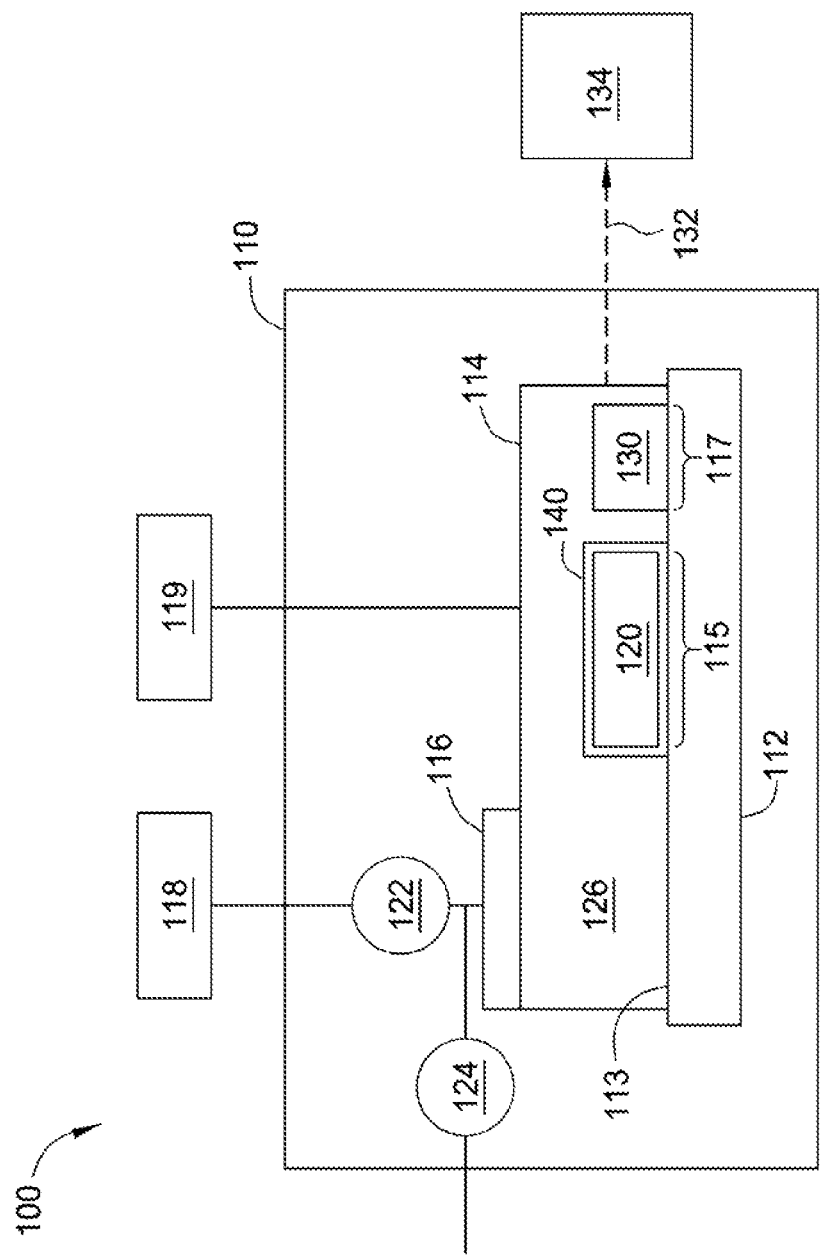
FIG. 1 is a schematic view of one example of a system for forming a composite part according to implementations described herein.

FIG. 1 is a schematic view of one example of a resin infusion system 100 for forming a composite part according to implementations described herein. The resin infusion system 100 may be a tool-less system (i.e., does not contain a hard or soft tool for molding the composite part). The resin infusion system 100 may be a vacuum assisted resin infusion system. The resin infusion system 100 includes a resin infusion device 110 to infuse a part skeleton 120 with resin 130 from a resin source. The part skeleton 120 is preformed prior to placement in the resin infusion system 100 within design or performance tolerances and/or specifications. In some implementations, the part skeleton 120 is formed using a 3-D printing process as described herein.

The resin infusion device 110 includes a mandrel 112, envelope 114, and a vacuum cup 116. The mandrel 112 has a surface 113. At least a portion of the surface 113 of the mandrel 112 may be planar. The mandrel 112 may be an aluminum plate. The surface 113 of the mandrel 112 may include a part-receiving zone 115 upon which the part skeleton 120 is placed. In some implementations, at least a portion of the mandrel 112 that defines the part-receiving zone has a planar surface. In some implementations where the resin 130 is internal to the resin infusion device 110, the surface 113 of the mandrel 112 may include a resin-receiving zone 117 upon which the resin 130 may be placed. In some implementations where the resin source is external to the resin infusion device 110, resin may be supplied from an external resin source to the resin-receiving zone 117.

The envelope 114 may be formed from a bagging film that is sealed upon the mandrel 112 to enclose the part skeleton 120 and the resin 130. The bagging film largely prevents air and/or gasses from passing therethrough. Generally, the bagging film includes any suitably impermeable membrane, layer, or barrier that does not appreciably adhere to the resin 130. Suitable materials from which the bagging film may be made include plastics, rubbers, resins, and the like.

The bagging film may be sealed to the mandrel 112 using a sealant. The sealant facilitates generating a gas tight or substantially gas impermeable seal between the bagging film and the mandrel 112. Examples of suitable sealing materials and/or methods of sealing include sticky, tacky and other such adhesive tapes or cordage, heat sealing, elastomeric seals, and the like. In other implementations, the sealant is optional and may be omitted. For example, the envelope 114 may include a bag, reusable bag, or other such film in which the resin infusion device 110 is placed. A vacuum generator 119 is in fluid communication with the envelope 114. The vacuum generator 119 may be controlled to remove a portion of the atmosphere from the envelope 114.

The vacuum cup 116 facilitates controlling the amount of compressive force the envelope 114 exerts on the resin 130. In general, the vacuum cup 116 is positioned over a vacuum region 126 opposite the resin 130 to draw the resin 130 toward the part skeleton 120 infusing the part skeleton 120 with the resin 130. For example, in one implementation, the vacuum cup 116 is disposed upon the envelope 114 at a portion of the envelope 114 that is opposite the resin-receiving zone 117 on which the resin 130 may be placed and the part-receiving zone 115, on which the part skeleton 120 may be placed, is positioned between the vacuum region 126 and the resin-receiving zone 117. The vacuum cup 116 is in fluid communication with a vacuum generator 118 that may be controlled to remove a portion of the atmosphere from the envelope 114.

The resin infusion device 110 optionally includes one or more valves such as valves 122 and 124. If present, the valves 122 and 124 are configured to control the amount of vacuum pressure within the vacuum cup 116. For example, by closing the valve 124 and opening the valve 122, the pressure within the vacuum cup 116 may be reduced by the vacuum generator 118. In another example, by closing the valve 122 and opening the valve 124, air or an inert gas (e.g., nitrogen surrounding the resin infusion system 100) at ambient pressure may be allowed to enter the vacuum cup 116. If the pressure in the vacuum cup 116 is less than the ambient pressure, the pressure within the vacuum cup 116 may be raised by the ingress of air or inert gas.

In some implementations, the part skeleton 120 may be covered in a permeable release film 140. The permeable release film 140 allows resin 130 to flow through the permeable release film 140 and into the part skeleton 120 yet will release after the resin infused part skeleton is cured. In some implementations, the permeable release film 140 is a porous film. In some implementations, the permeable release film 140 is made from fibers such as polytetrafluoroethylene fibers. In some implementations, the permeable release film 140 is made from fiberglass coated with tetrafluoroethylene. Suitable commercially available permeable release films that may be used with the implementations described herein include ARMALON® films.

In some implementations, the resin 130 may be solid or putty-like. In other implementations, liquid resin may be placed in the resin-receiving zone 117. For instance, the liquid resin may be placed in a depression in the mandrel 112, or a dike may be built around the liquid resin (e.g., using tacky tape covered with Teflon tape). In another implementation, the resin source may be positioned external to the resin infusion device 110. For instance, the source of resin may be positioned external to the device and supplied to the device via a resin supply line (not shown) and an inlet port (not shown).

The resin 130 is compressed into the part skeleton 120 in response to a pressure differential across the envelope 114. This pressure differential is such that an interior of the envelope 114 is at a relatively lower pressure than an exterior of the envelope 114. For example, the vacuum generator 119 in fluid connection with the envelope 114 may be configured to remove a portion of air and/or gasses from inside the envelope 114. In this manner, ambient air pressure may exert a force upon the envelope 114. In some implementations, the resin infusion device 110 may be placed inside a pressure vessel or autoclave. Placing the resin infusion device 110 inside a pressure vessel or autoclave allows greater pressure to be applied to the outside of the envelope 114.

The resin infusion device 110 may be heated 132 by a heat source 134. The heat source 134 is configured to raise the temperature of the resin 130 or otherwise impart thermal energy into the resin 130. The heat source 134 may include, for example, a heating element, infrared (IR) heater, oven, or autoclave. In a particular example, the heat source 134 includes an oven having an interior volume sufficiently large to contain the resin infusion device 110. In another example, the heat source 134 includes an autoclave having a pressure chamber with sufficient volume to contain the resin infusion device 110 and operable to increase the temperature and/or ambient pressure within the pressure chamber.

In response to being heated to a predetermined temperature and/or for a predetermined time, the viscosity of the resin 130 is initially reduced such that the resin 130 is operable to flow into or infuse the part skeleton 120. In response to further elevating the temperature and/or an extended curing period, the viscosity of the resin 130 is increased and the resin 130 solidifies due to an essentially irreversible chemical polymerization reaction. Following heating, the resin infusion device 110 may be removed from the heat source 134 or otherwise allowed to cool.

Figure 2:
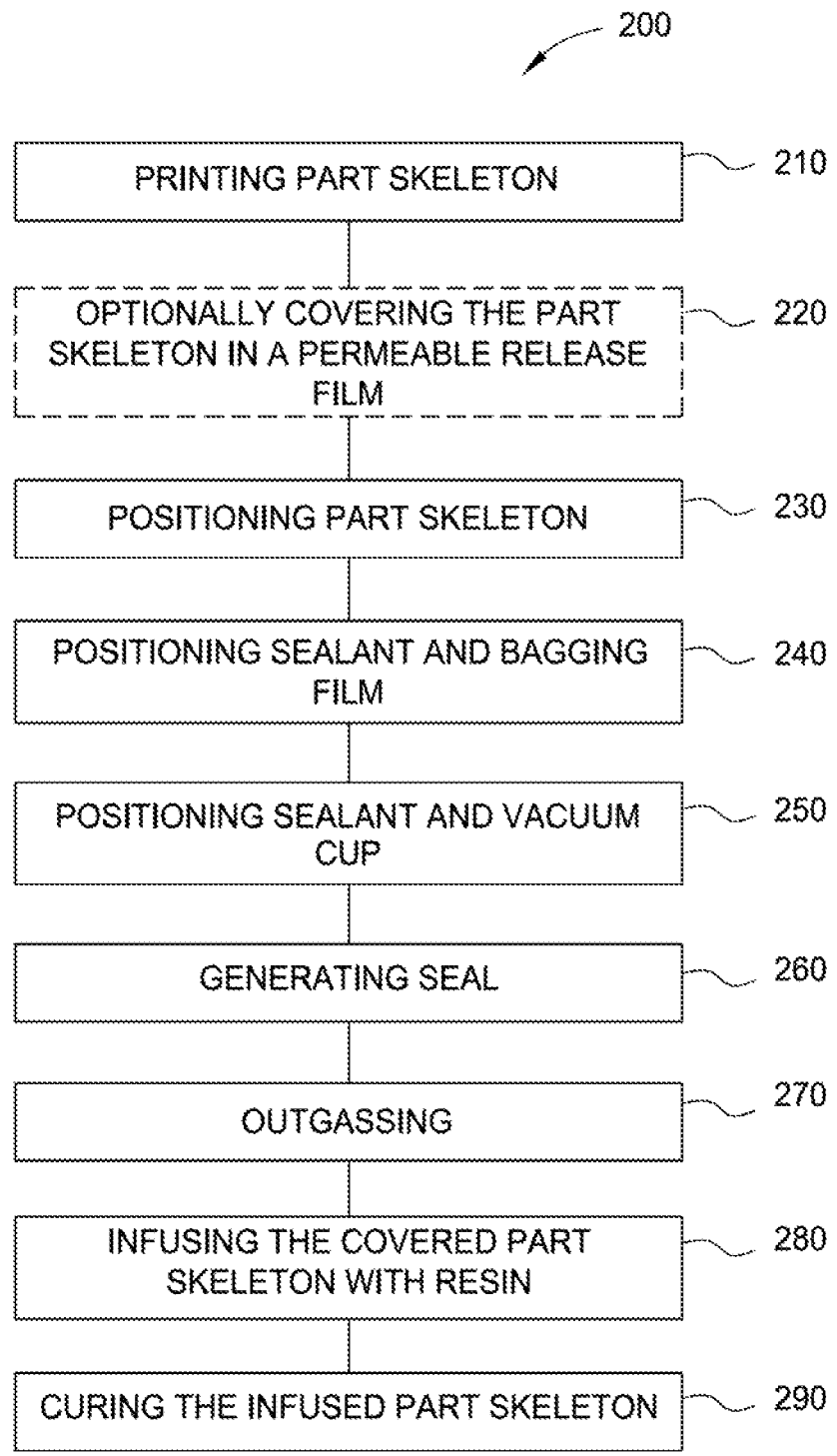
FIG. 2 is a flow diagram of a method of forming a composite part according to implementations describe herein.

FIG. 2 is a flow diagram of a method 200 of forming a composite part according to implementations describe herein. At process 210, the part skeleton is printed. The part skeleton may be formed using any suitable process that achieves the desired tolerances for the part skeleton. The part skeleton may be printed using an additive manufacturing process. An additive manufacturing process may include, but is not limited to a process, such as a PolyJet deposition process, ink-jet printing process, fused deposition modeling process ("FDM"), binder jetting process, powder bed fusion process, selective laser sintering process ("SLS"), stereolithography process ("SLA"), vat photopolymerization digital light processing, sheet lamination process, directed energy deposition process, or other similar 3-D deposition processes (e.g. 3-D printing process). Other types of additive manufacturing machines and related technologies are possible. Additive manufacturing processes, such as 3-D printing, have been found to be especially useful in forming part skeletons having complex features (e.g., parts with multiple contours, parts having multiple planes) that are difficult to form using currently available molding processes.

In one implementation, the part skeleton may be represented in a data structure readable by a computer rendering device or a computer display device. The computer-readable medium may contain a data structure that represents the part skeleton. The data structure may be a computer file, and may contain information about the structures, materials, textures, physical properties, or other characteristics of one or more articles. The data structure may also contain code, such as computer executable code or device control code that engages selected functionality of a computer rendering device or a computer display device. The data structure may be stored on the computer-readable medium. The computer-readable medium may include a physical storage medium such as a magnetic memory, floppy disk, or any convenient physical storage medium. The physical storage medium may be readable by the computer system to render the article represented by the data structure on a computer screen or a physical rendering device, which may be an additive manufacturing device, such as a 3D printer.

In one implementation, three dimensional printing (or 3-D printing) may be used to produce (or make) the part skeleton. In one implementation, a computer (CAD) model of the part skeleton is first made and then a slicing algorithm maps the information for every layer. In one non-limiting example of a 3-D printing process, a layer starts with a thin distribution of powder spread over the surface of a powder bed. A chosen binder material is then dispensed which selectively joins particles where the object is to be formed. Then a piston, which supports the powder bed and the part in progress, is lowered in order for the next powder layer to be formed. After each layer, the same process is repeated followed by a final heat treatment to make the part skeleton. In another example, the 3-D printing process may include, but is not limited to a process in which droplets of a liquid precursor composition material are dispensed on a surface and are then cured to form the part skeleton in layer-by-layer fashion. Since 3-D printing processes can exercise local control over the material composition, microstructure and surface texture, various (and previously inaccessible) complex part geometries may be achieved with this method.

In one non-limiting example, the additive manufacturing process may be used to build the part skeleton, layer-by-layer, by locally fusing or curing a matrix material, which may be in powder or liquid form. For example, the additive manufacturing machine may be a 3-D printer, which utilizes a slicing algorithm to draw detailed information for each layer of the part skeleton from 3-D map data. In one implementation, each part skeleton begins with a thin distribution of matrix material, which may comprise powder particles, spread over the surface of a bed. Using a technique similar to ink-jet printing, a binder material (not shown) selectively joins particles of matrix material where the part skeleton is to be formed. A piston moves the bed along with the in-progress part skeleton, lower, so that the next layer of matrix material can be spread and selectively joined. Each layer of the in-progress part skeleton is cured as the matrix material is being infused; consequently, the entire part skeleton is cured when completed.

The matrix material used to build the part skeleton may comprise any of a variety of curable, bondable or fusible materials. The matrix material used, depend on the application and the particular additive process used. The matrix material includes, but is not limited to, thermoset plastics such as epoxy or polyester resins, metals such as Al, Ti, Fe, and Ni, ceramics such as Si, $Al_2S_3$, SiC, and thermoplastics such as polyamide, Polyaryletherketone, Polyphenylene sulfide, Polyphthalamide and glassy microspheres, to name only a few. In some implementations, the matrix material may be mixed with additional reinforcement materials (e.g., carbon nanotubes) to strengthen the part skeleton in a desired direction.

In some implementations, the part skeleton is printed using a precursor made from a material comprising a polymer and a UV-curable additive. The precursor may be cured with UV radiation to obtain a UV-cured precursor. The UV-cured precursor may be exposed to a basic solution having a pH of from about 11 to about 14 for a predetermined amount of time followed by exposing the UV-cured precursor to a predetermined post-UV curing regimen. The temperature during the curing process may be increased from about room temperature to a temperature for a first predetermined amount of time followed by progressively decreasing the temperature over a second predetermined amount of time to obtain the part skeleton, and maintaining the UV-cured precursor in an inert environment during the post-UV curing regimen.

In one implementation, a photopolymer material is provided as a starting material. The photopolymer may be selected from a group including acrylics, urethanes, acrylates, and epoxy acrylates. Other suitable materials may be used so long as they may be processed through a 3-D printing apparatus as would be readily understood by one skilled in the field. The photopolymer material is introduced to an additive manufacturing apparatus, such as, for example, a 3-D printing apparatus (e.g., an Objet500 Connex Multi-Material 3D printer), or any similar 3D printing apparatus, as would be understood by those skilled in the art. The photopolymer may be mixed with a UV-curable component to form a photopolymer mixture. The photopolymer mixture is then supplied to the 3-D printer as would be readily understood by those skilled in the art. Alternatively, a photopolymer and a UV-curable additive may be supplied separately to the 3-D printer, as would also be readily understood. The part skeleton is then prepared according to readily understood 3-D printing protocols. In some implementations, the 3-D printed part skeleton is considered a precursor to the final part skeleton.

According to accepted 3-D manufacturing protocols, a 3-D manufactured part skeleton is often fabricated upon/or along with a support made from a supplied material. 3-D printers typically have multiple heads and multiple photopolymer cartridges. The software associated with the 3-D printer determines where support material is to be deposited to support the rest of the part skeleton structure. Such deposited support material prevents the printed part skeleton from sagging, warping, etc. This support material is typically a photopolymer containing hygroscopic compounds allowing the support material to swell/dissolve in the presence of solvents, such as, for example, water, propylene glycol, polyethylene glycol, glycerin and combinations thereof. This support is typically trimmed away from the 3-D fabricated part skeleton. In addition, extraneous and unwanted material may become attached to the 3-D fabricated part skeleton during the 3-D manufacturing process. In some implementations of the present disclosure, some amount of the support material diffuses/fuses into the surface layer of the part skeleton. The basic solution reacts with this surface layer, "draws out", and otherwise removes the support material.

In some implementations, the part skeleton has structural integrity (i.e. is suitably hardened to achieve dimensional stability), but is not yet suitable to withstand the thermal/pressure cycling that is required of a finished part skeleton. The 3-D printed part skeleton may be exposed to a post-processing solution to remove any unwanted material present on the part skeleton (i.e. unwanted material remaining on the part skeleton that is co-formed during the 3-D processing). In some implementations, the post-processing solution is a basic solution having a pH of from about 11 to about 14. Exemplary post-processing solutions include sodium hydroxide and sodium hydroxide-containing solutions having a pH of from about 11 to about 14. The part skeleton is removed from the post-processing solution after a predetermined period, and after substantially all of the unwanted material present on the part skeleton has been removed from the part skeleton. It is understood that an amount of physical debris removal from the 3-D manufactured part skeleton may also occur during a post-processing stage. The part skeleton may be further processed by exposing the precursor to a predetermined heating regimen in an inert environment substantially maintained at a pressure of, for example, from at least about 90 psi.

It is understood that pressures above 90 psi may be employed and maintained. The inert environment may comprise any noble gas, such as, for example, argon, nitrogen or combinations thereof, with a nitrogen environment being preferred. The heating apparatus may be any apparatus that provides a controllable and varying amount of heat. One particularly preferred device is an autoclave. The part skeleton may be post-cured at progressively increasing temperatures of from ambient, or room temperature up to a maximum temperature of from about 150 degrees Celsius to about 200 degrees Celsius. The temperature processing may include multiple temperature heating ramps and hold cycles (dwell periods). Following the temperature processing, the processed precursor is allowed to cool to ambient temperature, and brought to ambient pressure, and a finished part skeleton has been produced.

Optionally, at process 220, the part skeleton 120 is covered with a permeable release film 140. In some implementations, covering the part skeleton 120 includes wrapping the part skeleton 120 in a permeable release film. Suitable permeable release films allow resin to flow through the permeable release film 140 and into the part skeleton yet will release either prior to or after the resin, infused part skeleton is cured. In some implementations, the permeable release film is a porous film. In some implementations, the permeable release film is made from fibers such as polytetrafluoroethylene fibers and is porous. In some implementations, the permeable release film is made from fiberglass coated with tetrafluoroethylene. Suitable commercially available permeable release films include ARMALON® films.

At process 230, the part skeleton 120 may be positioned on the mandrel 112 in the part-receiving zone 115. The resin 130 may be positioned adjacent to the part skeleton 120 in the resin-receiving zone 117. In some implementations, the resin 130 is supplied from an external source. If present, infusion media is positioned. The infusion media may be positioned to cover some portion of the part skeleton 120. The infusion media may further be disposed upon some portion or abutting the resin 130 to enable the resin 130 to flow across the part skeleton 120 and towards the vacuum cup 116. In one implementation, the infusion media is positioned on the mandrel 112 and the part skeleton 120 and the resin 130 are positioned on the infusion media.

At process 240, after the resin 130 and part skeleton 120 have been positioned, the mandrel is covered in envelope 114 (e.g., bagging film). In one implementation, the envelope 114 is sealed upon the mandrel 112 to enclose the part skeleton 120 and the resin 130. To a large extent, the envelope 114 prevents air and/or gasses from passing therethrough. In one implementation, the envelope 114 is coupled with the mandrel 112 using a sealant. For example, a sticky, tacky, or adhesive ribbon or cord-like material may be disposed about a perimeter of the mandrel 112 and the envelope 114 is positioned. For example, the envelope 114 may be disposed to extend to or beyond the sealant.

At process 250, the vacuum cup 116 is coupled with the envelope 114. The vacuum cup 116 may be coupled with the envelope using a sealant. The sealant may be disposed upon the envelope 114 on the side of the part skeleton 120 opposite the resin 130. For example, a sticky, tacky, or adhesive ribbon or cord-like material may be disposed on the envelope 114. The vacuum cup 116 may be disposed upon the sealant. In addition, vacuum lines connecting the vacuum cup 116 to the vacuum generator 118 may be installed.

At process 260, sufficient force may be placed upon the envelope 114 to form a seal between the envelope 114 and the mandrel 112. In addition, the vacuum cup 116 may be similarly pressed upon the sealant to generate a seal between the vacuum cup 116 and the sealant and/or between the sealant and the envelope 114. A leak check may be performed at this time.

At process 270, an outgassing procedure may be performed. For example, the vacuum generators 118 and 119 may create a lower (than ambient) pressure to hold the envelope 114 above the resin 130, creating a volume through which gasses may escape prior to infusion. In a particular example, such as with the use of thermoset resins, the heat source 134 may apply sufficient heat to the resin 130 to reduce the viscosity of the resin 130. Bubbling activity begins. The outgassing may be considered completed when the bubbling activity stops. In some implementations, the outgassing is not performed. For instance, the resin 130 may already be sufficiently degassed.

At process 280, the covered part skeleton is infused with resin. In general, infusion occurs in response to the pressure exerted by the bagging film or envelope 114 to overcome the resistance of the resin 130 to flowing through the part skeleton 120. A pressure differential is created between the outside of the envelope 114 to control the rate and pressure at which the resin 130 is infused into the part skeleton 120. Heat may be applied while the part skeleton is infused with resin.

At process 290, the resin infused part skeleton is cured. Various resin formulations employ a variety of methods for chemical hardening or polymerization. For example, a group of resins broadly classified as thermoresins or thermoset resins are polymerized by heating. In this regard, sufficient heat and/or pressure is applied to the infused resin to facilitate a chemical reaction or polymerization in the resin. In other instances, the resin may be polymerized by the addition of a hardener or catalyst. Once mixed with the catalyst, the resin will polymerize given sufficient time. Thus, in another example, sufficient time is allowed to transpire to facilitate polymerization.

In some implementations, the resin infusion device 110 may be placed in a pressure vessel such as an autoclave. During curing, the autoclave increases ambient pressure and heats the resin. During infusion, the vacuum cup 116 may be at a pressure higher than standard atmospheric pressure. The pressure differential may be actively or passively controlled during the pressurization phase of the autoclave run.

The pressure differential may be passively controlled so that vacuum cup pressure automatically maintains a fixed pressure difference below ambient pressure in the autoclave. For instance, the passive control may be accomplished by a regulator or check valve that actuates at a set pressure differential (e.g., 5 psi) so that the vacuum cup pressure automatically remains 5 psi below the ambient pressure in the autoclave throughout the pressurization cycle.

After curing, the cured part is removed from the resin infusion device 110. The cured part may be finished, for example, by sanding, polishing, milling, cleaning, or the like.

FIG. 3A is a perspective view of one example of a tubular part skeleton 300 formed according to implementations described herein. FIG. 3B is a front view of the tubular part skeleton 300 formed according to implementations described herein. FIG. 3C is a cross-sectional view of the tubular part skeleton 300 taken along line 3C-3C of FIG. 3B according to implementations described herein. The tubular part skeleton 300 is depicted prior to resin infusion. The tubular part skeleton 300 may be formed using an additive manufacturing process as described herein.

In some implementations, the tubular part skeleton 300 includes an elongated tubular body 310 and a web structure 320 to provide support throughout the tubular part skeleton 300. As depicted, for example, in FIGS. 3A-3C, the web structure 320 may extend throughout the tubular part skeleton 300 to provide support throughout the tubular part skeleton 300. The web structure 320 of the tubular part skeleton 300 may thus support the tubular part skeleton 300 against tensile, compressive, and shear forces. The web structure 320 may also reinforce the tubular part skeleton 300 along multiple planes. In some implementations, the web structure 320 includes an internal truss structure 322 and an external truss structure 324. The external truss structure 324 may, for example, provide support against tensile and compressive forces acting vertically through the tubular part skeleton 300, and the internal truss structure 322 may provide support against tensile, compressive, and shear forces along the various planes containing the respective trusses.

The elongated tubular body 310 is formed along a longitudinal axis 312. The elongated tubular body 310 has a first end 314 and a second end 316 opposite the first end 314. The elongated tubular body 310 defines a hollow cavity 325 extending along the longitudinal axis 312. The hollow cavity 325 has a first opening at the first end 314 and a second opening at the second end 316. In some implementations, one end of the hollow cavity 325 is open and the opposing end of the hollow cavity 325 is sealed. In some implementations, both ends of the hollow cavity are sealed. The hollow cavity 325 may contain electrical wiring, sensors or other electrical functionality.

The elongated tubular body 310 includes a first set of spokes 330a-330m (collectively "330") extending radially from the elongated tubular body 310. In some implementations, each first set of spokes is equidistantly spaced relative to each adjacent first set of spokes. For example, first set of spokes 330b is equidistantly spaced relative first set of spokes 330a and 330c. Each spoke 332a-332h (collectively "332") of the first set of spokes 330 may be perpendicular to the longitudinal axis 312. In some implementations, each spoke 332 of the first set of spokes 330 is positioned in a plane perpendicular to the longitudinal axis 312. In some implementations, at least one of the spokes 330 may be angled relative to the longitudinal axis 312. Each spoke 332 of the first set of spokes 330 is circumferentially spaced relative to adjacent spokes 332 of the first set of spokes 330. For example, as shown in FIG. 3B, spoke 332b is circumferentially and equidistantly spaced relative to spoke 332a and spoke 332c.

Each spoke 332 includes a plurality of joints or nodes 336a, 336b (collectively "336") where bars or struts 350 and spokes 332 connect. Each spoke of tubular part skeleton 300 includes two nodes 336a and 336b. Each spoke 332 may include any number of nodes 336 depending upon the number of desired truss structures or layers in each part skeleton.

Multiple first sets of spokes 330a-330m are axially spaced along the length of the elongated tubular body 310. In some implementations, as depicted in FIG. 3B, the spokes 332a-332h of each of the first set of spokes 330a-330m are aligned with the spokes 332a-332h of the other first sets of spokes 330a-330m. For example, spoke 332a of the first set of spokes 330a and spoke 332a of the first set of spokes 330b may be aligned.

The elongated tubular body 310 further includes a second set of spokes 340a-340l (collectively "340") extending radially from the longitudinal axis 312. In some implementations, each second set of spokes is equidistantly spaced relative to each adjacent second set of spokes. For example, second set of spokes 340b is equidistantly spaced relative second set of spokes 340a and 340c. Each spoke 342a-342h (collectively "342") of the second set of spokes 340 may be perpendicular to the longitudinal axis 312. In some implementations, each spoke 342 of the second set of spokes 340 is positioned in a plane perpendicular to the longitudinal axis 312. Each spoke 342 of the second set of spokes 340 is circumferentially spaced relative to adjacent spokes 342 of the second set of spokes 340. For example, as shown in FIG. 3B, spoke 342b is circumferentially and equidistantly spaced relative to spoke 342a and spoke 342c. Each spoke 342 includes a plurality of joints or nodes (not shown) where struts 350 and spokes 342 connect. In the implementation of FIGS. 3A-3C, each spoke includes two nodes (not shown). Each spoke 342a-342h may include any number of nodes depending upon the number of desired truss structures or layers in each part skeleton.

Multiple second sets of spokes 340a-340m are axially spaced along the length of the elongated tubular body 310. In some implementations, as depicted in FIG. 3B, the spokes 342a-342h of each second set of spokes 340a-340m are aligned with the spokes 342a-342h of the other second sets of spokes 340a-340m.

In some implementations, each spoke 342 of the second set of spokes 340 is staggered or offset relative to each spoke 332 of the first sets of spokes 330. For example, with reference to FIG. 3B, spoke 342b is staggered relative to spoke 332a and spoke 332b.

Although in FIGS. 3A-3C eight spokes are depicted in each of the first set of spokes 330 and the second set of spokes 340 it should be understood that any number of spokes may be used. Further, although each spoke depicted in FIGS. 3A-3C has two nodes, any number of nodes may be included depending upon the desired size or strength of the final product.

The tubular part skeleton 300 further includes bars or struts 350 oriented at non-perpendicular or non-parallel angles relative to the longitudinal axis 312 to form web structure 320. Although struts 350 are shown as angled, in some implementations, struts 350 are parallel to the longitudinal axis 312. In some implementations, the struts 350 are curved. The struts 350 extend from a node 336 of a first spoke 332 to a node (not shown) of a second spoke 342. For example, a strut may extend from spoke 342b to spoke 332a and another strut may extend from spoke 342b to spoke 332b. The outer surface of the struts 350 defines the cylindrical outer surface of the tubular part skeleton 300. In accordance with one implementation of the present disclosure, four struts 350a-350d converge at a single node 336. It is believed that this arrangement of struts, as well as the configuration of internal nodes, provides the tubular part skeleton 300 with substantial axial, torsional and bending strength. The illustrated arrangement of struts 350 defines a plurality of square openings 360. As shown in FIG. 3A, each square opening 360 is defined by four angled struts.

In a further implementation, the tubular part skeleton 300 includes end nodes 370, which are formed by the intersection of two struts 350e, 350f. As shown in FIG. 3A, the first end 314 and the second end 316 of the elongated tubular body 310 terminate with end nodes formed by the intersection of two angled struts.

FIG. 4A is a perspective view of another example of a tubular part skeleton 400 formed according to implementations described herein. FIG. 4B is a front view of the tubular part skeleton 400 formed according to implementations described herein. FIG. 4C is a cross-sectional view of the tubular part skeleton 400 taken along line 4C-4C of FIG. 4B according to implementations described herein. The tubular part skeleton 400 is similar to the tubular part skeleton 300 except that a web structure 420 of the tubular part skeleton 400 extends through the center of the tubular part skeleton 400 meaning there is no hollow cavity. Further, the tubular part skeleton 400 lacks a second set of spokes meaning that some of the bars or struts are coupled with each other to form joints or nodes. The tubular part skeleton 400 is depicted prior to resin infusion. The tubular part skeleton 400 may be formed using an additive manufacturing process as described herein.

In some implementations, the tubular part skeleton 400 includes an elongated tubular body 410 and a web structure 420 to provide support throughout the tubular part skeleton 400. As depicted, for example, in FIGS. 4A-4C, the web structure 420 extends throughout the tubular part skeleton 400 including the central portion of tubular part skeleton 400 to provide support throughout the tubular part skeleton 400. The web structure 420 of the tubular part skeleton 400 may thus support the tubular part skeleton 400 against tensile, compressive, and shear forces. The web structure 420 may also reinforce the tubular part skeleton 400 along multiple planes. In some implementations, the web structure 420 includes an internal truss structure 422, a middle truss structure 424 and an external truss structure 426. The external truss structure 426 may, for example, provide support against tensile and compressive forces acting vertically through the tubular part skeleton 400, and the internal truss structure 422 and the middle truss structure 424 may provide support against tensile, compressive, and shear forces along the various planes containing the respective trusses.

The elongated tubular body 410 is formed along a longitudinal axis 412. The elongated tubular body 410 has a first end 414 and a second end 416 opposite the first end 414. The elongated tubular body 410 includes a set of spokes 430a-430m (collectively "430") extending radially from the longitudinal axis 412. In some implementations, each set of spokes is equidistantly spaced relative to each adjacent second set of spokes. For example, set of spokes 430b is equidistantly spaced relative set of spokes 430a and 430c. Each spoke 432a-432h (collectively "432") of the set of spokes 430 may be perpendicular to the longitudinal axis 412. In some implementations, each spoke 432 of the set of spokes 430 is positioned in a plane perpendicular to the longitudinal axis 412. Each spoke 432 of the set of spokes 430 is circumferentially and equidistantly spaced relative to adjacent spokes 432 of the set of spokes 430. For example, as shown in FIG. 4B, spoke 432b is circumferentially and equidistantly spaced relative to spoke 432a and spoke 432c. Each spoke 432 includes a plurality of joints or nodes 436a, 436b (collectively "436") where bars or struts 450 and spokes 432 connect. In the implementation of FIGS. 4A-4C, each spoke includes two nodes 436a and 436b. Each spoke 432 may include any number of nodes 436 depending upon the number of desired truss structures or layers in each tubular part skeleton 400.

Multiple sets of spokes 430a-430m are axially spaced along the length of the elongated tubular body 410. In some implementations, as depicted in FIG. 4B, the spokes 432a-432h of each of the sets of spokes 430a-430m are aligned with the spokes 432a-432h of the other sets of spokes 430a-430m. For example, spoke 432a of the set of spokes 430a and spoke 432a of the first set of spoke 430b may be aligned.

Although in FIGS. 4A-4C eight spokes are depicted in each of the set of spokes 430 it should be understood that any number of spokes may be used. Further, although each spoke depicted in FIGS. 4A-4C has two nodes 436a, 436b, any number of nodes may be included depending upon the desired size or strength of the final product.

The tubular part skeleton 400 further includes bars or struts 450 oriented at non-perpendicular or non-parallel angles relative to the longitudinal axis 412. The struts 450 extend from a node 436 of a spoke 432 to another strut 450 extending from a node (not shown) of an adjacent spoke 432. For example, strut 450a may couple with strut 450b to form a joint or node. The outer surface of the struts 450 defines the cylindrical outer surface of the tubular part skeleton 400. In accordance with one implementation of the present disclosure, four angled struts 450c-450f converge at a single node 436. It is believed that this arrangement of angled struts, as well as the configuration of internal nodes, provides the tubular part skeleton 400 with substantial axial, torsional and bending strength. The illustrated arrangement of struts 450 defines a plurality of square openings 460. As shown in FIG. 4A, each square opening 460 is defined by four struts.

In a further implementation, the tubular part skeleton 400 includes end nodes 470, which are formed by the intersection of two struts 450g, 450h. As shown in FIG. 4A, the first end and the second end of the elongated tubular body terminate with end nodes formed by the intersection of two angled struts.

FIG. 5A is a perspective view of another example of a tubular part skeleton 500 formed according to implementations described herein. FIG. 5B is a front view of the tubular part skeleton 500 formed according to implementations described herein. FIG. 5C is a cross-sectional view of the tubular part skeleton 500 taken along line 5C-5C of FIG. 5B. The tubular part skeleton 500 is similar to the tubular part skeleton 300 except that each spoke contains six nodes increasing the number of truss structure or layers in the tubular part skeleton 500. The tubular part skeleton 500 is depicted prior to resin infusion. The tubular part skeleton 500 may be formed using an additive manufacturing process as described herein.

In some implementations, the tubular part skeleton 500 includes an elongated tubular body 510 and a web structure 520 to provide support throughout the tubular part skeleton 500. As depicted, for example, in FIGS. 5A-5C, the web structure 520 may extend throughout the tubular part skeleton 500 to provide support throughout the tubular part skeleton 500. The web structure 520 of the tubular part skeleton 500 may thus support the tubular part skeleton 500 against tensile, compressive, and shear forces. The web structure 520 may also reinforce the tubular part skeleton 500 along multiple planes.

The elongated tubular body 510 is formed along a longitudinal axis 512. The elongated tubular body 510 has a first end 514 and a second end 516 opposite the first end 514. The elongated tubular body 510 defines a hollow cavity 525 extending along the longitudinal axis 512. The hollow cavity 525 has a first opening at the first end 514 and a second opening at the second end 516. In some implementations, one end of the hollow cavity 525 is open and the opposing end of the hollow cavity 525 is sealed. In some implementations, both ends of the hollow cavity are sealed. The hollow cavity 525 may contain electrical wiring, sensors or other electrical functionality.

The elongated tubular body 510 includes a first set of spokes 530a-530i (collectively "530") extending radially from the elongated tubular body 510. In some implementations, each first set of spokes is equidistantly spaced relative to each adjacent first set of spokes. For example, first set of spokes 530b is equidistantly spaced relative first set of spokes 530a and 530c. Each spoke 532a-532h (collectively "532") of the first set of spokes 530 is perpendicular to the longitudinal axis 512. In some implementations, each spoke 532 of the first set of spokes 530 is positioned in a plane perpendicular to the longitudinal axis 512. In some implementations, at least one of the spokes 530 may be angled relative to the longitudinal axis 512. Each spoke 532 of the first set of spokes 530 is circumferentially spaced relative to adjacent spokes 532 of the first set of spokes 530. For example, as shown in FIG. 5B, spoke 532b is circumferentially and equidistantly spaced relative to spoke 532a and spoke 532c.

Each spoke 532 includes a plurality of joints or nodes 536a-536f (collectively 536) where bars or struts 550 and spokes 532 connect. Each spoke of tubular part skeleton 500 includes six nodes 536a-536f Each spoke 532 may include any number of nodes 536 depending upon the number of desired truss structures or layers in each part skeleton.

Multiple first sets of spokes 530a-530i are axially spaced along the length of the elongated tubular body 510. In some implementations, as depicted in FIG. 5B, the spokes 532a-532h of each of the first set of spokes 530a-530i are aligned with the spokes 532a-532h of the other first sets of spokes 530a-530i. For example, spoke 532a of the first set of spokes 530a and spoke 532a of the first set of spokes 530b may be aligned.

The elongated tubular body 510 further includes a second set of spokes 540a-540h (collectively "540") extending radially from the longitudinal axis 512. In some implementations, each second set of spokes is equidistantly spaced relative to each adjacent second set of spokes. For example, second set of spokes 540b is equidistantly spaced relative second set of spokes 540a and 540c. Each spoke 542a-542h (collectively "542") of the second set of spokes 540 may be perpendicular to the longitudinal axis 512. In some implementations, each spoke 542 of the second set of spokes 540 is positioned in a plane perpendicular to the longitudinal axis 512. Each spoke 542 of the second set of spokes 540 is circumferentially spaced relative to adjacent spokes 542 of the second set of spokes 540. For example, as shown in FIG. 5B, spoke 542b is circumferentially and equidistantly spaced relative to spoke 542a and spoke 542c. Each spoke 542 includes a plurality of joints or nodes (not shown) where struts 550 and spokes 542 connect. In the implementation of FIGS. 5A-5C, each spoke includes two nodes (not shown). Each spoke may include any number of nodes depending upon the number of desired truss structures or layers in each part skeleton.

Multiple second sets of spokes 540a-540h are axially spaced along the length of the elongated tubular body 510. In some implementations, as depicted in FIG. 5B, the spokes 542a-542h of each second set of spokes 540a-540h are aligned with the spokes 542a-542h of the other second sets of spokes 540a-540h.

In some implementations, as shown in FIG. 5B, each spoke 542 of the second set of spokes 540 is staggered or offset relative to each spoke 532 of the first sets of spokes 530. For example, with reference to FIG. 5B, spoke 542b is staggered relative to spoke 532a and spoke 532b.

Although in FIGS. 5A-5C eight spokes are depicted in each of the first set of spokes 530 and the second set of spokes 540 it should be understood that any number of spokes may be used. Further, although each spoke depicted in FIGS. 5A-5C has six nodes, any number of nodes may be included depending upon the desired size or strength of the final product.

The tubular part skeleton 500 further includes bars or struts 550 oriented at non-perpendicular or non-parallel angles relative to the longitudinal axis 512 to form web structure 520. Although struts 550 are shown as angled, in some implementations, struts 550 are parallel to the longitudinal axis 512. In some implementations, the struts 550 are curved. The struts 550 extend from a node 536 of a first spoke 532 to a node (not shown) of a second spoke 542. For example, a strut may extend from spoke 542b to spoke 532a and another strut may extend from spoke 542b to spoke 532b. The outer surface of the struts 550 defines the cylindrical outer surface of the tubular part skeleton 500. In accordance with one implementation of the present disclosure, four struts 550a-550d converge at a single node 536. It is believed that this arrangement of struts, as well as the configuration of internal nodes, provides the tubular part skeleton 500 with substantial axial, torsional and bending strength. The illustrated arrangement of struts 550 defines a plurality of square openings 560. As shown in FIG. 5A, each square opening 560 is defined by four angled struts.

In a further implementation, the tubular part skeleton 500 includes end nodes 570, which are formed by the intersection of two angled struts 550e, 550f. As shown in FIG. 5A, the first end 514 and the second end 516 of the elongated tubular body 510 terminate with end nodes formed by the intersection of two angled struts.

Figure 6:
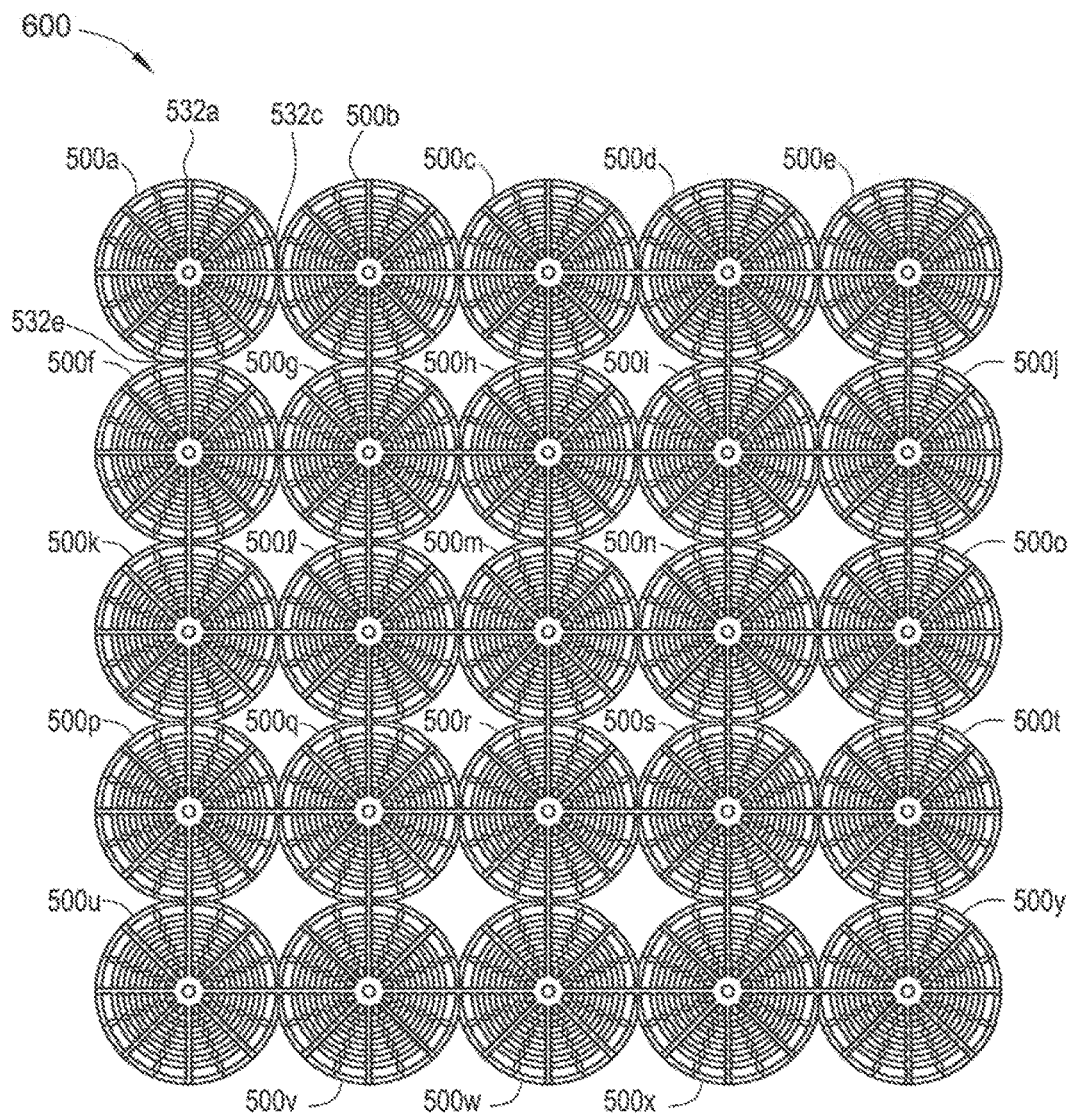
FIG. 6 is a schematic front view of an interconnected sheet of multiple interconnected tubular part skeletons depicted in FIGS. 5A-5C.

FIG. 6 is a schematic front view of an interconnected sheet 600 of multiple stacked interconnected tubular part skeletons 500a-500y. The tubular part skeletons 500a-500y are depicted as a 5×5 structure. Although depicted as a 5×5 structure, it should be understood that any number of interconnected tubular part skeletons may be used depending upon the desired characteristics (e.g., strength and flexibility) of the final product. The tubular part skeletons 500a-500y are interconnected via a common spoke 532 shared between adjacent interconnected tubular part skeletons. For example, tubular part skeleton 500a and tubular part skeleton 500b are interconnected via common spoke 532c and tubular skeleton part 500a and tubular part skeleton 500f are interconnected via common spoke 532e.

Figure 7:
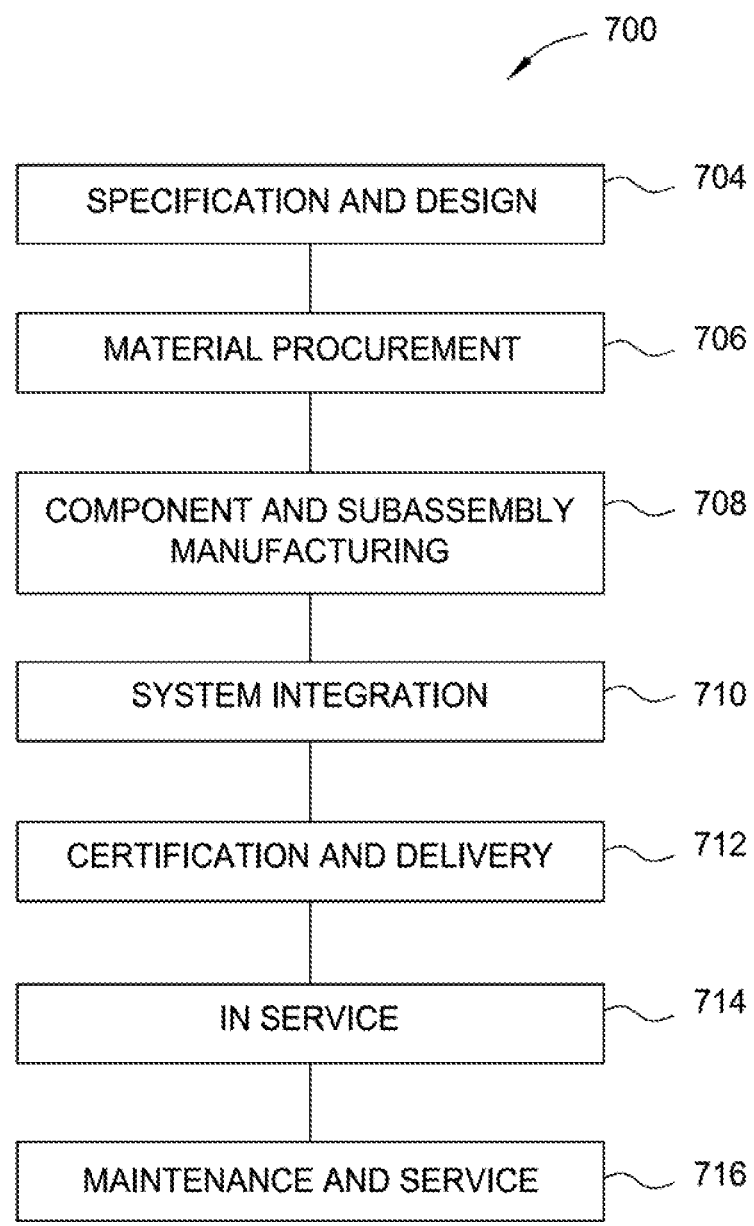
FIG. 7 is a flow diagram of aircraft production and service methodology.
Figure 8:
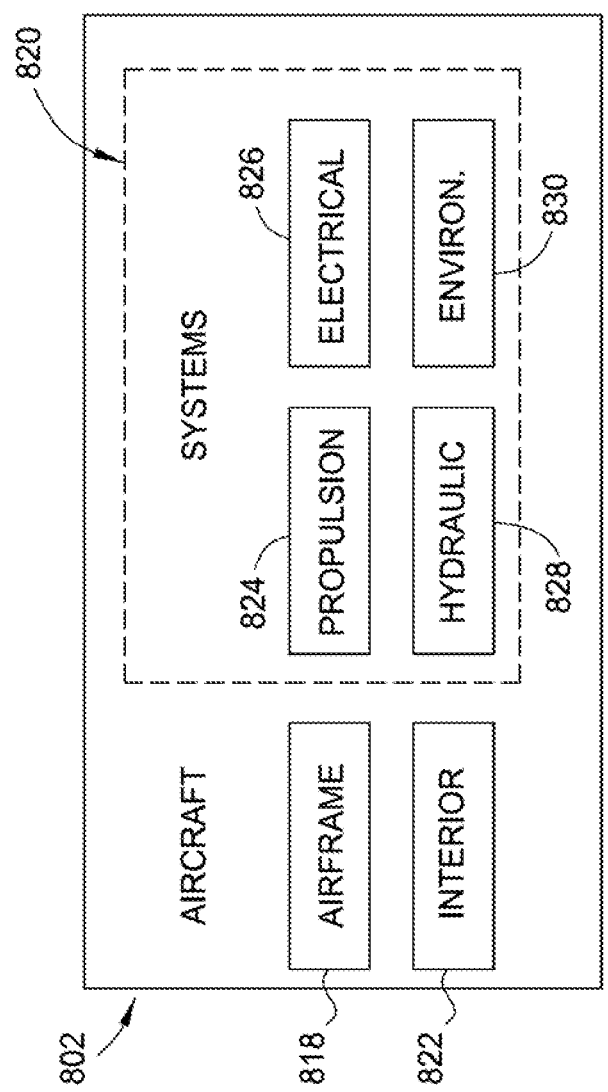
FIG. 8 is an illustration of a block diagram of an aircraft.

Referring more particularly to the drawings, implementations of the disclosure may be described in the context of an aircraft manufacturing and service method 700 as shown in FIG. 7 and an aircraft 802 as shown in FIG. 8. During pre-production, method 700 may include specification and design 704 of the aircraft 802 and material procurement 706. During production, component and subassembly manufacturing 708 and system integration 710 of the aircraft 802 takes place. Thereafter, the aircraft 802 may go through certification and delivery 712 in order to be placed in service 714. While in service by a customer, the aircraft 802 is scheduled for routine maintenance and service 716 (which may include modification, reconfiguration, refurbishment, and so on).

Each of the processes of method 700 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 8, the aircraft 802 produced by exemplary method 700 may include an airframe 818 with a plurality of systems 820 and an interior 822. Examples of high-level systems 820 include one or more of a propulsion system 824, an electrical system 826, a hydraulic system 828, and an environmental system 830.

Apparatus and methods embodied herein may be employed during any one or more of the stages of the production and service method 700. For example, components or subassemblies corresponding to production stage 708 may be fabricated or manufactured in a manner similar to components or subassemblies produced while the aircraft 802 is in service. In addition, one or more apparatus implementations, method implementations, or a combination thereof may be utilized during the production stages 708 and 710, for example, by substantially expediting assembly of or reducing the cost of an aircraft 802. Similarly, one or more of apparatus implementations, method implementations, or a combination thereof may be utilized while the aircraft 802 is in service, for example and without limitation, to maintenance and service 716.

While the foregoing is directed to implementations of the present disclosure, other and further implementations of the disclosure may be devised without departing from the basic scope thereof, and the scope thereof is determined by the claims that follow.

What is claimed is:

1. A method of manufacturing, comprising:
 printing a part skeleton;
 covering the part skeleton with a permeable release film to form a covered part skeleton;
 positioning the covered part skeleton on a flat surface of a mandrel, wherein the mandrel comprises:
  a resin-receiving zone on which a supply of resin is positioned; and
  a part-receiving zone on which the covered part skeleton is positioned;
 sealing a bagging film to the mandrel to generate an envelope enclosing the covered part skeleton and the supply of resin, wherein the envelope and the mandrel define a vacuum region with the part-receiving zone positioned in between the resin-receiving zone and the vacuum region;
 coupling a vacuum cup with the bagging film, wherein the vacuum cup is coupled with the bagging film above the vacuum region; and
 infusing the covered part skeleton with resin from the supply of resin to form an infused covered part skeleton.

2. The method of claim 1, wherein the part skeleton is printed using an additive manufacturing process.

3. The method of claim 2, wherein the additive manufacturing process is a 3D printing process selected from a PolyJet printing process, an ink-jet printing process, a stereolithography process ("SLA"), a fused deposition modeling process ("FDM"), and a selective laser sintering process ("SLS").

4. The method of claim 1, wherein the part skeleton has at least one feature selected from: compound contours, multiple recesses, undercuts, projections, and truss structures.

5. The method of claim 1, wherein the part skeleton is printed using a matrix material selected from thermoset plastics, metals, ceramics, and thermoplastics.

6. The method of claim 1, wherein the permeable release film allows resin to flow through the permeable release film and into the part skeleton.

7. The method of claim 1, wherein the permeable release film is porous and is made from polytetrafluoroethylene fibers.

8. The method of claim 1, further comprising curing the infused covered part skeleton to form a composite part.

9. The method of claim 1, wherein the flat surface of the mandrel extends from a first end of the mandrel to a second end of the mandrel.

10. A method of manufacturing, comprising:
 positioning a printed part skeleton on a mandrel, wherein the mandrel comprises:
  a resin-receiving zone on which a supply of resin is positioned; and
  a part-receiving zone having a flat surface on which the printed part skeleton is positioned;
 sealing a bagging film to the mandrel to generate an envelope enclosing the printed part skeleton and the supply of resin, wherein the envelope and the mandrel define a vacuum region with the part-receiving zone positioned in between the resin-receiving zone and the vacuum region;
 coupling a vacuum cup with the bagging film, wherein the vacuum cup is coupled with the bagging film above the vacuum region; and
 infusing the printed part skeleton with resin from the supply of resin to form a composite part.

11. The method of claim 10, further comprising:
 covering the printed part skeleton with a permeable release film prior to infusing the printed part skeleton with resin.

12. The method of claim 10, wherein infusing the printed part skeleton with resin from the supply of resin comprises generating a pressure differential across the bagging film using a vacuum generator coupled with the vacuum cup, wherein the pressure differential is such that an interior of the bagging film is at a relatively lower pressure than an exterior of the bagging film.

13. The method of claim 10, wherein the flat surface of the mandrel extends from a first end of the mandrel to a second end of the mandrel.

* * * * *